United States Patent
Sundararajan et al.

(10) Patent No.: US 7,979,366 B2
(45) Date of Patent: Jul. 12, 2011

(54) SYSTEM AND METHOD FOR COARSE-CLASSING VARIABLES IN A PROPENSITY MODEL

(75) Inventors: Ramasubramanian Gangaikondan Sundararajan, Bangalore (IN); Tarun Bhaskar, Bangalore (IN)

(73) Assignee: General Electric Company, Niskayuna, NY (US)

( * ) Notice: Subject to any disclaimer, the term of this patent is extended or adjusted under 35 U.S.C. 154(b) by 761 days.

(21) Appl. No.: 11/971,164

(22) Filed: Jan. 8, 2008

(65) Prior Publication Data

US 2009/0177600 A1    Jul. 9, 2009

(51) Int. Cl.
 G06F 15/18 (2006.01)
 G06E 1/02 (2006.01)
 G06N 3/12 (2006.01)
(52) U.S. Cl. .............................. 706/13; 706/16; 706/21
(58) Field of Classification Search ....................... 706/13
 See application file for complete search history.

(56) References Cited

OTHER PUBLICATIONS

Cheng et al., "Multiple criteria rainfall-runoff model calibration using a parallel genetic algorithm in a cluster of computers", Hydrological Sciences-Journal-des Sciences Hydrologiques, 50(6) Dec. 2005; pp. 1069-1087.*

* cited by examiner

*Primary Examiner* — David R Vincent
*Assistant Examiner* — Nathan H Brown, Jr.
(74) *Attorney, Agent, or Firm* — Fletcher Yoder

(57) ABSTRACT

A technique is provided to coarse-class one or more customer characteristics used in a predictive model. A set of functions are used to represent partition points of the customer characteristic into smaller classes. Each of the final classes of the customer characteristic is represented separately in the predictive model. An initial set of functions may be established to provide an initial set of partitions points of the customer characteristic. The set of functions is then processed using a genetic algorithm to evolve the partition points to new values. Processing the set of partitions using the genetic algorithm may continue until a stopping criterion is reached.

22 Claims, 9 Drawing Sheets

| CUSTOMER | CUSTOMER DATA ||||||| Y |
|---|---|---|---|---|---|---|---|
| | X1 | X2 | X3 | X4 | ••• | Xw | |
| 1 | 45 | $X_{2,1}$ | $X_{3,1}$ | $X_{4,1}$ | ••• | $X_{w,1}$ | 0 |
| 2 | 18 | $X_{2,2}$ | $X_{3,2}$ | $X_{4,2}$ | ••• | $X_{w,2}$ | 1 |
| 3 | 35 | $X_{2,3}$ | $X_{3,3}$ | $X_{4,3}$ | ••• | $X_{w,3}$ | 0 |

⋮

| 100 | 19 | $X_{2,100}$ | $X_{3,100}$ | $X_{4,100}$ | ••• | $X_{w,100}$ | 1 |
| 101 | 28 | $X_{2,101}$ | $X_{3,101}$ | $X_{4,101}$ | ••• | $X_{w,101}$ | 0 |

⋮

| 190 | 20 | $X_{2,190}$ | $X_{3,190}$ | $X_{4,190}$ | ••• | $X_{w,190}$ | 1 |
| 191 | 60 | $X_{2,191}$ | $X_{3,191}$ | $X_{4,191}$ | ••• | $X_{w,191}$ | 0 |

⋮

| 500 | 18 | $X_{2,500}$ | $X_{3,500}$ | $X_{4,500}$ | ••• | $X_{w,500}$ | 1 |
| 501 | 30 | $X_{2,501}$ | $X_{3,501}$ | $X_{4,501}$ | ••• | $X_{w,501}$ | 0 |

⋮

| z | 50 | $X_{2,n}$ | $X_{3,n}$ | $X_{4,n}$ | ••• | $X_{w,z}$ | 0 |

FIG. 9

| CUSTOMER | AGE ($X_i$) | Y |
|---|---|---|
| 2 | 18 | 1 |
| 500 | 18 | 1 |
| ⋮ | ⋮ | |
| 100 | 19 | 1 |
| ⋮ | ⋮ | |
| 190 | 20 | 1 |
| ⋮ | ⋮ | |
| 101 | 28 | 0 |
| ⋮ | ⋮ | |
| 501 | 30 | 0 |
| ⋮ | ⋮ | |
| 3 | 35 | 0 |
| ⋮ | ⋮ | |
| 1 | 45 | 0 |
| ⋮ | ⋮ | |
| z | 50 | 0 |
| ⋮ | ⋮ | |
| 191 | 60 | 0 |

FIG. 10

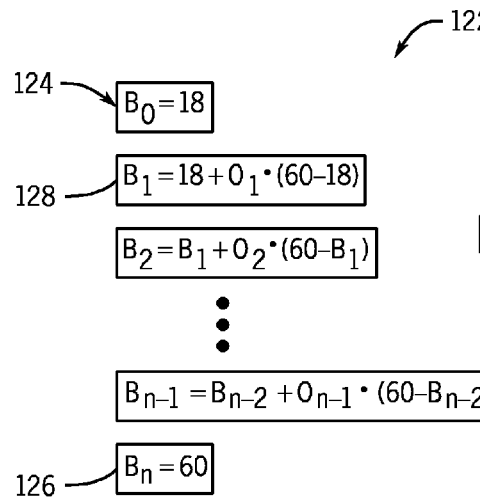
FIG. 11
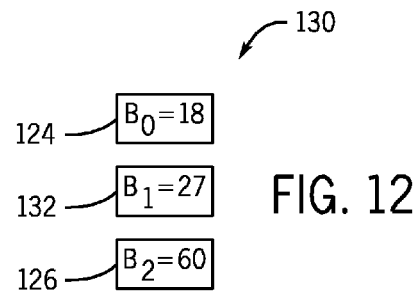
FIG. 12
$$f(x) = \beta_0 + \beta_1 B_1 + \beta_2 B_2 + \beta_3 X_2 + \ldots + \beta_{n-1} X_w, Y \in \{0, 1\}$$
FIG. 13

SYSTEM AND METHOD FOR COARSE-CLASSING VARIABLES IN A PROPENSITY MODEL

BACKGROUND

The invention relates generally to modeling customer behavior. In particular, the invention relates to developing a predictive model for a customer's behavior by coarse-classing a variable in the predictive model.

Good customer relationship management (CRM) has become a valuable tool in today's highly competitive markets. CRM enables a business to know who its customers are, what its customers buy, how much its customers earn, how much its customers spend and other similar types of information that allow a company to understand the market for its goods and/or services. This information helps a company to predict certain events in the future, such as predicting how much profit a bank may make from a business activity. This information also helps a company to find out the propensity of its customer for a particular behavior, such as how likely the customer is to respond to an offer, how likely the customer is to default on a loan, or pay a loan earlier than scheduled, etc. One method of predicting customer behavior that businesses have utilized is a predictive model.

A predictive model attempts to predict a future result based on past experience. As noted above, the result of the predictive model could be a predicted profit from a business activity. For example, a predictive model may be developed to estimate a bank's annual profit from its credit card business. The result of a predictive model may be any real number. A subset of predictive modeling is propensity modeling. A propensity model provides an estimate of the propensity of a customer to respond to a particular event in a particular manner. Thus, a propensity model is based on a binary situation, either an event occurs or it does not. Typically, a predictive model is based on previous experiences with existing customers. For this purpose, companies maintain databases of their customers replete with data from previous transactions, conduct surveys, or customer response sheets. For example, the predictive model may be based on the customer's age, the customer's income, how a customer responded to a similar event in the past, and/or many other customer attributes. Each of these attributes may be a variable used in the predictive model. In addition, a coefficient may be used to weight each of the attributes to provide the best model of the customer's behavior. For example, the customer's age may be more indicative than the customer's income as to whether or not a customer will respond in a particular manner to an event. Consequently, the coefficient for the customer's age would be greater than the coefficient for the customer's income.

One technique that may be used in developing a predictive model is the coarse-classing of one or more of the customer attributes used in a propensity model. This is desirable when the variable has a non-linear relationship with the response. For example, the propensity of a customer to respond in a particular manner may not be a linear function of the customer's age, i.e., a customer forty years of age may not be twice as likely to respond in a given manner to an event as a twenty year old. However, the age of the customer may still be a good predictor of the customer's behavior. Therefore, by coarse-classing the customer's into two or more age ranges, a different coefficient may be assigned to each of these classes of customers.

There are two existing methods for coarse-classing variables in a predictive model. In the first method, the classes are created using domain knowledge. In the second method, the dataset is divided into equal sized quantiles (e.g. Deciles) based on the range of the attribute under consideration. For each quantile, the information value is calculated based on the number of events and non-events in that quantile. The quantiles are then grouped based on a visual inspection. While the first approach relies on a good understanding of the domain, the second approach is constrained by the fact that the starting solutions are equal sized quantiles, which might not lead to an optimal partitioning of the range.

Therefore, there is a need for a technique that improves the development of coarse-classes in a predictive model. In particular, a technique is desired that would incorporate existing domain knowledge, but not be restricted by it.

BRIEF DESCRIPTION

A technique is providing for developing a predictive model for customer behavior. Customer characteristics are used to develop the predictive model. A technique is used to coarse-class one or more of the customer characteristics used in the predictive model. A set of functions are used to represent partition points of the customer characteristic into smaller classes. Each of the final classes of the customer characteristic is represented separately in the predictive model. An initial set of functions are established to provide an initial set of partitions (and classes) of the customer characteristic. The set of functions is then processed using a genetic algorithm to evolve the partition points to new values. After an interval, the set of partitions evolved by the genetic algorithm are evaluated using an objective function. For example, the classes of the customer characteristic established by the set of partitions may be evaluated based on the diversity between the classes. The more diverse one class is compared to its adjoining class, the better the coarse-classing of the customer characteristic. Processing the set of partitions using the genetic algorithm may continue until a stopping criterion is reached.

DRAWINGS

These and other features, aspects, and advantages of the present invention will become better understood when the following detailed description is read with reference to the accompanying drawings in which like characters represent like parts throughout the drawings, wherein.

Figure 5:
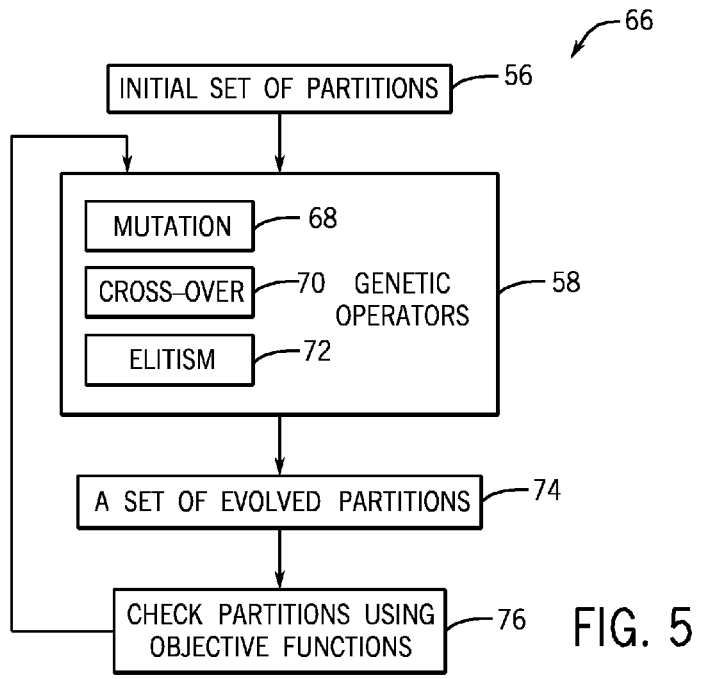
Figure 6:
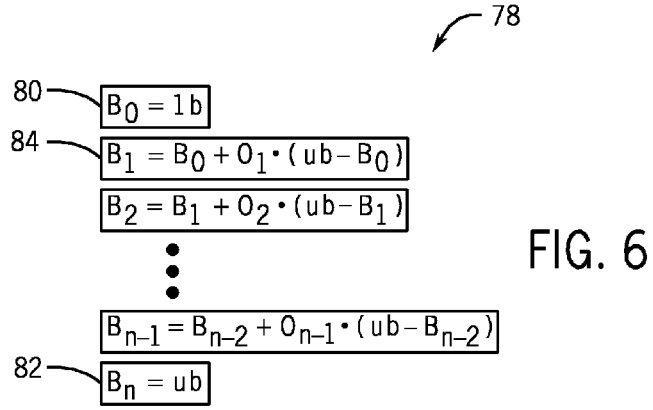
Figure 7:
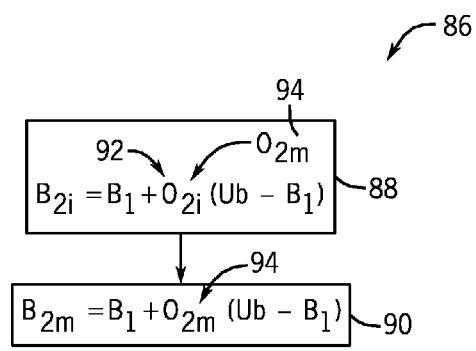
Figure 8:
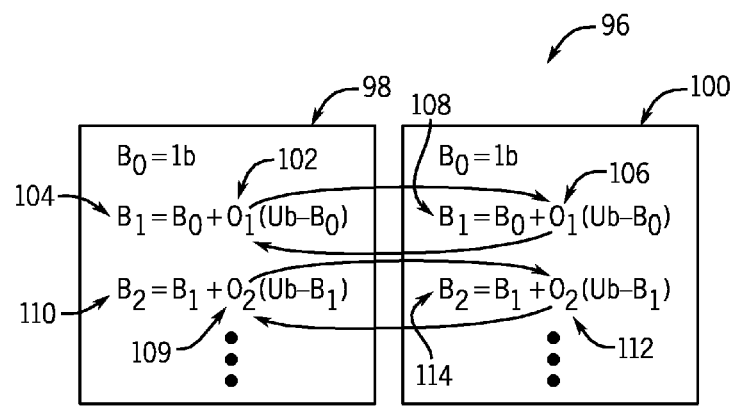
Figure 14:
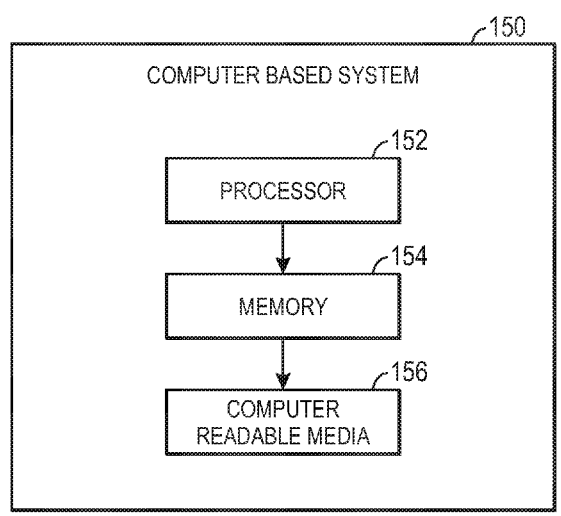

FIG. 5. is a block diagram of a technique for coarse-classing a variable of a propensity model of an event, in accordance with an exemplary embodiment of the present technique;

FIG. 6 is a schematic diagram of an initial set of functions used to represent a plurality of classes of a characteristic, in accordance with an exemplary embodiment of the present technique;

FIG. 7 is a schematic diagram of a function used to represent a partition point of a class of a characteristic undergoing mutation by a genetic algorithm, in accordance with an exemplary embodiment of the present technique;

FIG. 8 is a schematic diagram of two sets of functions used to represent a class of a characteristic undergoing cross-breeding by a genetic algorithm, in accordance with an exemplary embodiment of the present technique;

FIG. 9 is an embodiment of a database comprising customer data from previous attempts at engaging the customers, in accordance with an exemplary embodiment of the present technique;

FIG. 10 is an embodiment of the database of FIG. 9 sorted based on the first customer characteristic, in accordance with an exemplary embodiment of the present technique;

FIG. 11 is an initial set of functions representative of a plurality of classes of the first customer characteristic, in accordance with an exemplary embodiment of the present technique;

FIG. 12 is a final set of functions representative of a plurality of classes of the first customer characteristic after processing by the genetic algorithm, in accordance with an exemplary embodiment of the present technique;

FIG. 13 is an embodiment of a propensity model having coarse-classes of the first customer characteristic, in accordance with an alternative exemplary embodiment of the present technique; and FIG. 14 is an embodiment of a computer-based system for developing and using a propensity model, in accordance with an exemplary embodiment of the present technique.

DETAILED DESCRIPTION

Figure 1:
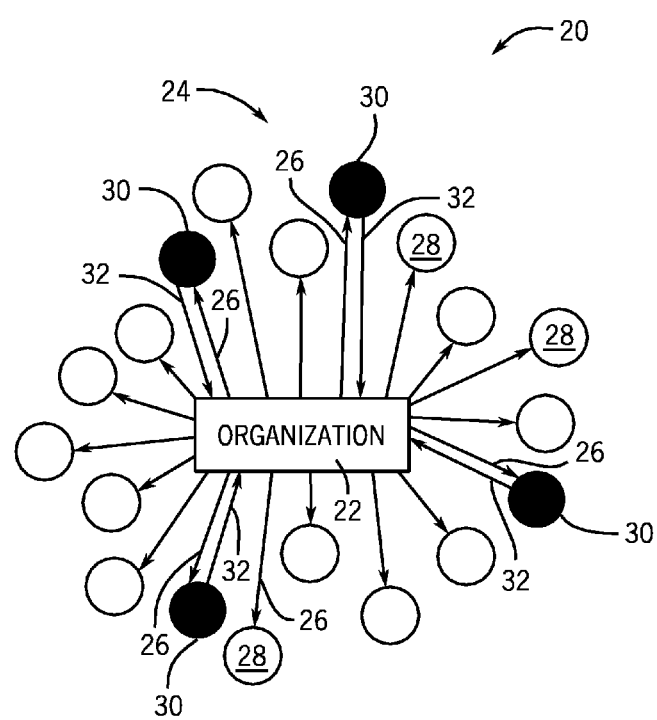
FIG. 1 is a schematic representation of a system for engaging customers/clients/partners, in accordance with an exemplary embodiment of the present technique.

Referring now to FIG. 1, the present invention will be described as it might be applied in conjunction with an exemplary technique for predicting the propensity of a particular event to occur, as represented generally by reference numeral 20. For example, the technique enables the propensity of a customer to accept a commercial offer made by a business to be predicted. However, the technique may used in conjunction with any predictive model, not just a propensity model.

In the illustrated embodiment, an organization 22 has a large number of potential customers, represented generally by reference numeral 24. The organization may be any type organization that engages in transactions with an outside organization or entity. In this embodiment, the organization 22 has made an offer 26 to each of its customers 24 in the past. A large number of customers 24, represented generally by reference numeral 28, rejected the offer 26 in the past. However, a number of customers, represented generally by reference numeral 30, replied to the offer 26 with an acceptance 32. From these past experiences, a propensity model may be developed to predict the propensity of a customer to accept an offer in the future based on certain characteristics of the customer.

Figure 2:
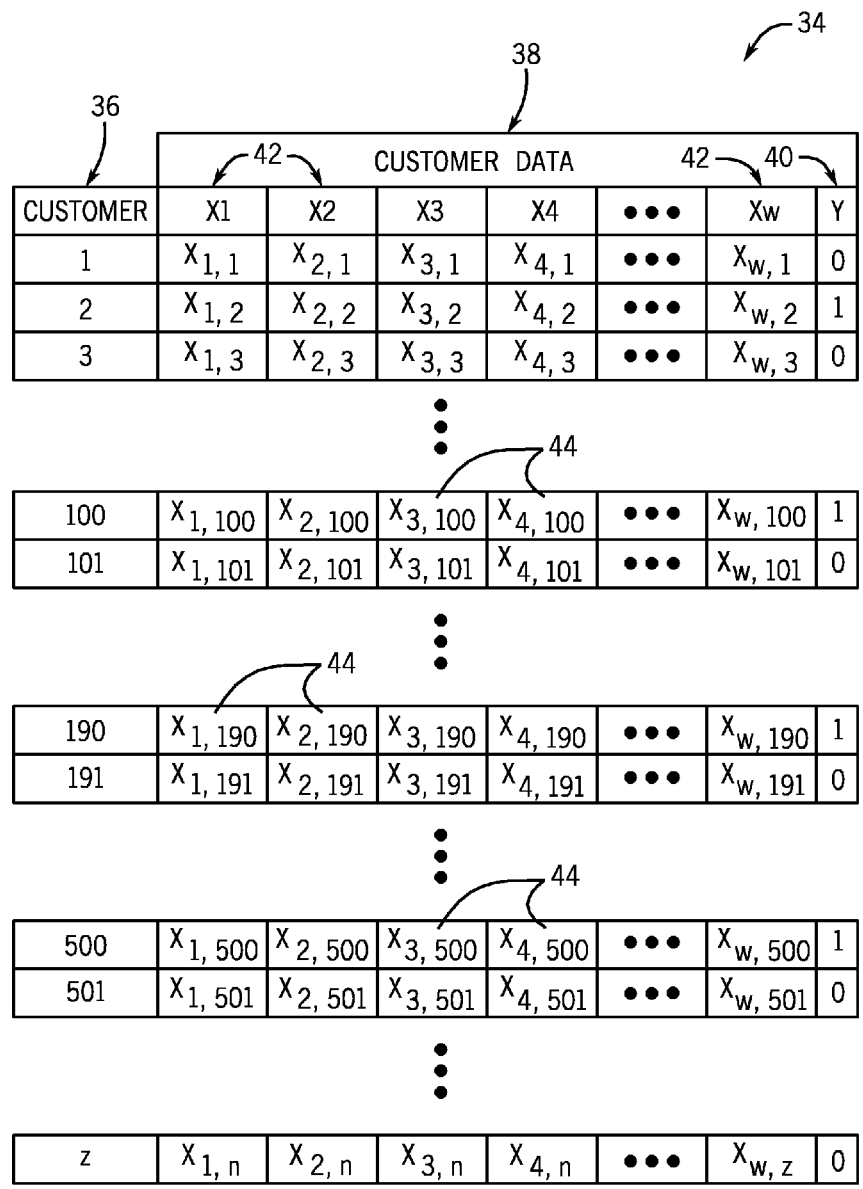
FIG. 2 is an embodiment of a database comprising customer data from previous attempts at engaging the customers, in accordance with an exemplary embodiment of the present technique.

Referring generally to FIG. 2, the technique utilizes a database of data regarding past offers made to the customers, represented generally by reference numeral 34, to develop a model of the propensity of a customer to accept an offer made in the future. In the illustrated embodiment, the database 34 comprises a list of customers 36 and data 38 representative of the customer. Each row of the database corresponds to a specific customer and each column corresponds to a different characteristic of the customer. The customer data 38 may be information which the company has obtained from previous transactions with the customer, or information obtained from a third party, such as a credit scoring agency.

In particular, the customer data 38 also comprises customer response data, "y", 40 corresponding to the customer's response to an offer in the past. In this embodiment, the response data 40 is in binary form. In this embodiment, the customer response data 40 has the value "1" if the customer accepted a past offer. Conversely, the response data 40 has the value "0" if the customer did not accept the past offer. However, the response may be a different range of values in other predictive models. In this embodiment, a customer is listed in the list of customers 36 separately for each offer made to the customer. For example, an offer that was made to a customer that was accepted may be represented in the database 34 and a separate entry may exist for the customer in the database for a different offer made to the customer that was declined. In this embodiment, the acceptance rate for customers responding to an offer is very low, only four acceptances out of over five hundred offers made to customers.

The customer data 38 also includes customer characteristic data, represented generally by reference numeral 42. In this embodiment, each customer characteristic, "X", has its own column in the database 34 and the database is adapted to store a plurality of different customer characteristics, from "$X_1$" to "$X_w$". The customer characteristics may be anything representative of the customer, such as the age of the customer, the annual income of the customer, the geographic location of the customer, the area of employment of the customer, etc.

In the illustrated embodiment, each customer characteristic 42 and the response data 40 for each offer are stored in a data box 44. For example, a data box 44 is used to store the value of a first customer characteristic, "$X_1$", of a first customer, "1". In the representation of a customer database provided in FIG. 2, the value corresponding to the first characteristic, "$X_1$", of the first customer, "1", is represented in the data box 44 as "$X_{1,1}$". The first "1" in the subscript corresponds to the first customer characteristic and the second "1" in the subscript corresponds to the first customer. As noted above, the first characteristic, "$X_1$", may be the customer's age, the customer's annual income, etc. Similarly, a different data box 44 is used to store the value of a second customer characteristic, "$X_2$", of the first customer, "1". The value corresponding to the second characteristic, "$X_2$", of the first customer, "1" is represented in the data box 44 as "$X_{2,1}$". The "2" in the subscript corresponds to the second customer characteristic and the "1" in the subscript corresponds to the first customer.

Figure 3:
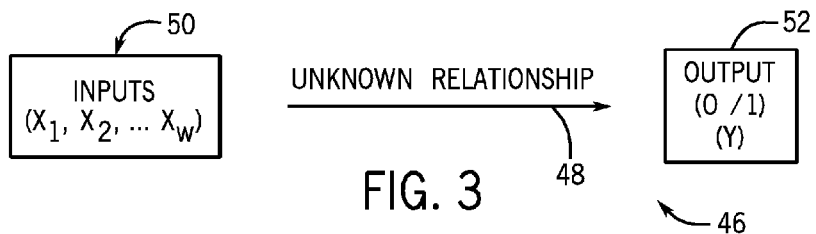
FIG. 3 is a is a schematic diagram of the relationship between inputs and outputs that form the basis for developing a propensity model of an event, in accordance with an exemplary embodiment of the present technique.

Referring generally to FIG. 3, a schematic diagram of the basis for developing a propensity model is presented, and represented generally by reference numeral 46. The development of the propensity model is based on identifying an unknown relationship 48 between various inputs 50 and outputs 52. In this example, the inputs 50 are the various customer characteristics and the outputs 52 are the customer's response to a past offer, either accepting or declining the offer. Once the unknown relationship 48 is established, a model of the propensity of an event to occur in the future may be established. In reference to FIG. 2, propensity modeling tries to find a relationship between the "X's" and the "y", i.e., a relationship between the customer characteristics and the customer's response to a previous situation. More specifically, the objective is to find a function, "f", which maps the "X's" to the "y". The resulting function, "f", is the propensity model.

The following equation is a propensity model for "n" customer characteristics that is a linear function of "X":

$$f(X)=\beta_0+\beta_1 X_1+\beta_2 X_2+\ldots+\beta_n X_n, y\in\{0,1\} \qquad (1)$$

The greater the relative value of f(X), the greater the propensity of the event to occur. In this embodiment, the closer the value of f(X) to one, as opposed to zero, the greater the propensity of the event to occur. The objective of propensity modeling is to find an optimal set of "β's" so that the function, "f", gives a "good" map of the relationship between the "X's" and the "y", i.e., the relationship between the customer characteristics and the customer's response to past situations. In this case, the objective of propensity modeling is to estimate the values of "β's" such that the "1's" are captured properly.

The propensity model provided in equation (1) is less accurate when the relationship between the customer characteristic and the customer's response is non-linear. To capture this non-linearity in a propensity model, an input variable may be transformed into several classes through the use of dummy variables. These dummy variables are then used as inputs in the propensity model. In the following example, the customer characteristic $X_1$ is transformed into three dummy variables, $B_1$, $B_2$, and $B_3$. If the customer characteristic $X_1$ corresponds to customer age, then the dummy variables may correspond to various ranges in customer age. $B_1$ may correspond to customer's 18 to 25 years of age, $B_2$ may correspond to customer's 26 to 49 years of age, and $B_3$ may correspond to customer's 50 years of age and older. Each of these dummy variables has their own coefficient, $\beta_1$, $\beta_2$, and $\beta_3$, respectively. Thus, equation (1) may be transformed into the following equation:

$$f(X)=\beta_0+\beta_1 B_1+\beta_2 B_2+\beta_3 B_3+\beta_4 X_2+ \ldots +\beta_n \cdot X_n, y \in \{0,1\} \quad (2)$$

The process of partitioning the range of values of an input variable is known as coarse-classing. A good coarse-classing of an input variable will capture the non-linear relationship well. In addition, each class will be distinct from its adjacent class if the coarse-classing is done well. Finally, good coarse-classing will enable an accurate propensity model to be developed.

Figure 4:
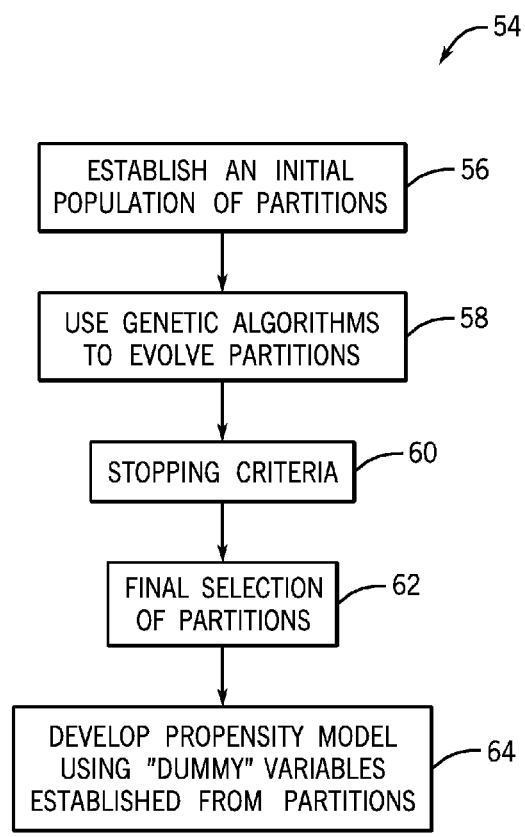
FIG. 4 is a block diagram of a technique for developing a propensity model of an event, in accordance with an exemplary embodiment of the present technique.

Referring generally to FIG. 4, a block diagram of a technique for developing a propensity model using coarse-classing of an input variable is presented, and represented generally by reference numeral 54. As will be discussed in more detail below, the technique utilizes genetic algorithms to establish the partitions used to separate an input variable into classes. These classes are represented by dummy variables in the propensity model. However, techniques other than genetic algorithms may be used to establish the partitions and thereby define the classes of the input variable.

In the illustrated embodiment, an initial population of partitions for the range of the customer characteristic is established, represented generally by block 56. There may be one or more sets of partitions within the initial population of partitions. In addition, the initial population may be selected at random or from previously established "good" models" of partitions. Using the age of a customer as an example, the age range of the customers from youngest to oldest may be partitioned into a set of smaller ranges of ages of the customers. The number and ranges of these initial partitions may be established at random or based on previous models of the age ranges of customers. A dummy variable is used to represent each of the ranges of the customer characteristic defined by the partitions. For example, a first range of ages defined by the partitions may be represented by a first dummy variable, "$B_1$". A second range of ages defined by the partitions may be represented by a second dummy variable, "$B_2$".

The initial population of partitions is then evolved using a genetic algorithm, represented generally by block 58. The genetic algorithm introduces changes in the partitions using changes associated with evolution and sexual reproduction, such as mutation and cross-over. For example, the ages of customers may be partitioned into six different age ranges. After the genetic algorithm has evolved the set of partitions, the ages of the customers may be partitioned into only three age ranges, each range differing from any of the initial age ranges.

In the illustrated embodiment, the genetic algorithm continues to evolve the populations of partitions until a stopping criterion is reached, represented generally by block 60. The stopping criteria may be the passage of a specified number of generations of change produced by the genetic algorithm. Alternatively, the stopping criteria may be that the genetic algorithm is failing to improve the population of partitions significantly when analyzed using objective criteria.

When the process of evolution using the genetic algorithm has been completed, a final selection of a set of partitions is made, as represented generally by reference numeral 62. Dummy variables are then used to represent the classes defined by the final set of partitions in the development of a propensity model, as represented generally by block 64. The propensity model may be developed using any available technique for developing propensity models.

Referring generally to FIG. 5, a block diagram of the process of using a genetic algorithm to evolve a set of partitions is presented, and represented generally by reference numeral 66. As discussed above, initial populations of partitions are established, represented generally by block 56. As also discussed above, the initial population of partitions is then evolved using a genetic algorithm, represented generally by block 58. The genetic algorithm is adapted to evolve the population of partitions using techniques similar to those found in nature during evolution and reproduction. In the illustrated embodiment, the genetic algorithm is adapted to evolve the partitions using a process akin to mutation, represented generally by block 68. For example, the partitions may be changed at random to simulate mutation. In addition, two sets of partitions may be modified by the genetic algorithm using a process akin to cross-over, as represented generally by block 70. Cross-over is the process whereby a new set of partitions is created from two or more parent sets of partitions. In this embodiment, the genetic algorithm simulates cross-over by randomly swapping one or more partitions from one set of partitions to another set of partitions. However, other types of cross-over may be used. For example, instead of swapping values of one or more partitions between different sets of partitions, the values of the partitions in two different sets of partitions may be averaged. In addition, the genetic algorithm is adapted to introduce elitism into the evolution of the partitions, as represented generally by block 72. Elitism is the act of maintaining a set of partitions having desirable attributes across generations. The "elite" set of partitions having the desirable characteristics may be used for cross-over and mutation, but an original version of the "elite" set of partitions is maintained for future generations. In the illustrated embodiment, after the genetic algorithm has been used to evolve the sets of partitions, a final set of evolved partitions is produced, represented generally by block 74.

After each generation or after a desired number of generations, the population of partitions is evaluated using one or more objective functions, as represented generally by block 76. In this embodiment, the objective function attempts to identify classes that have a good predictive power of the response, "y". The predictive power of each class, "i", can be characterized by a logarithm:

$$L_i = \text{Log(the \% of ``1's'' captured in the class/the \% of ``0's'' captured in the class).} \quad (3)$$

The greater the value of the logarithm, the better is the predictive power of the class. In addition, an adjacency value is established to enable the diversity of adjacent classes' values of $L_i$ to be evaluated. For each class, "i", the adjacency value is represented as:

$$A_i=(|L_i-L_{i-1}|+|L_i+-L_{i+1}|)/2. \tag{4}$$

In this embodiment, the objective function established the average adjacency value for each set of partitions in the population of partitions. The greater the average adjacency value across all classes, the better. However, objective functions other than the average adjacency value may be used to evaluate the coarse-classing.

The set, or sets, of evolved partitions are then processed once again using the genetic algorithm. As above, the genetic algorithm may be used to evolve the set of partitions further using techniques representative of mutation, crossing-over, etc. In addition, in this embodiment, the set of partitions that maximized the average adjacency value is subject to the elitism function in the genetic algorithm and is maintained across generations. As discussed above, this process is repeated until a specified stopping criterion is reached. In this embodiment, the set of partitions having the maximum average adjacency value when the stopping criterion is reached is selected as the final set of partitions for use in developing a propensity model.

Referring generally to FIG. 6, an embodiment of an initial set of partitions is presented, and represented generally by reference numeral 78. In this embodiment, the lower boundary of a range of a customer characteristic is represented as "lb." The upper boundary of the range of the customer characteristic is represented as "ub." A lower endpoint, "$B_0$", represented generally by reference numeral 80, corresponds to the lower boundary, "lb." An upper endpoint, "$B_n$", represented generally by reference numeral 82, corresponds to the upper boundary, "ub."

There are initially "n" partitions between the lower endpoint 80 and the upper endpoint 82, $B_0$ and $B_n$, respectively. Each of the partition points between $B_0$ and $B_n$ are variable and are defined by a function. For example, the first partition point, $B_1$, represented generally by reference numeral 84, is represented by the following equation:

$$B_1=B_0+O_1(ub-B_0). \tag{5}$$

Where: $O_1$ is a variable having a value from zero to one.

The functions used to establish the partition points are evolved by the genetic algorithm. In particular, the variable "$O_1$" is the portion of the function that defines the partition point and is the portion of the function that is evolved by the genetic algorithm. Each of the partition points between $B_0$ and $B_n$ is a similar function of a variable, represented in each by "O". If the value of the variable "O" becomes zero, that partition point drops out and the number of partitions in the set of partitions is reduced by one.

Referring generally to FIG. 7, an embodiment of a mutation of a partition point is presented, and represented generally by reference numeral 86. In this embodiment, the partition point is the second partition point, $B_2$. The partition point at an initial generation, "$B_{2i}$", is represented generally by reference numeral 88. The partition point after mutation, "$B_{2m}$", is represented generally by reference numeral 90. In the initial generation, the variable "O" of the function has the value "$O_{2i}$", represented generally by reference numeral 92. During processing by the genetic algorithm, a new value for the variable "O" is created by the genetic algorithm, "$O_{2m}$", represented generally by reference numeral 94. The value for "$O_{2m}$" may be selected at random by the genetic algorithm. However, another technique may be used to select the value for "$O_{2m}$".

Referring generally to FIG. 8, an embodiment of crossover between two sets of partition points is presented, and represented generally by reference numeral 96. There are two sets of partitions presented: a first set of partitions 98 and a second set of partitions 100. In the illustrated embodiment, the value of variable "$O_1$", represented by reference numeral 102, of partition point "$B_1$", represented by reference numeral 104, of the first set of partition points 98 is swapped with the value of variable "$O_1$", represented by reference numeral 106, of partition point "$B_1$", represented by reference numeral 108, of the second set of partition points 100. Similarly, the value of variable "$O_2$", represented by reference numeral 109, of partition point "$B_2$", represented by reference numeral 110, of the first set of partition points 98 is swapped with the value of variable "$O_2$", represented by reference numeral 112, of partition point "$B_2$", represented by reference numeral 114, of the second set of partition points 100. The variables to be crossed over may be selected at random by the genetic algorithm. Alternatively, a technique may be used to select the variables to be crossed-over based on past modeling or some other factor.

Referring generally to FIG. 9, an embodiment of customer data is presented, as represented generally by reference numeral 116. In this embodiment, the first customer characteristic, $X_1$, represented generally by reference numeral 118, is the customer's age. The customer's age 118 is to be coarse-classed using the techniques described above.

Referring generally to FIG. 10, an embodiment of the customer data of FIG. 9 sorted by age is presented, as represented generally by reference numeral 120. In this embodiment, the only customer information shown is the list of customer's names 36, the customer's ages 118, and the customer's response 40. The customer's age 118 and their response 40 are used in the development of the classes.

Referring generally to FIG. 1, an embodiment of an initial set of partitions for coarse-classing the age of the customer is presented, and represented generally by reference numeral 122. The value of the lower boundary, "lb", in this embodiment is eighteen years of age, as obtained from the customer's age data 118. The value of the upper boundary, "ub", in this embodiment is sixty years of age, as obtained from the customer's age data 118. Thus, the first endpoint $B_0$, represented generally by reference numeral 124, has the value "eighteen". The second endpoint $B_n$, represented generally by reference numeral 126, has the value "sixty". The value of the first partition point, "$B_1$", represented generally by reference numeral 128, is a function of the first variable, "$O_1$", and the values of "lb" and "ub". In this embodiment, the value of the first partition point 128 has a value equal to eighteen plus the value of "$O_1$" times the difference of sixty minus eighteen. By changing the value of "$O_1$", the genetic algorithm is able to adjust the partition points and, thus, the classes.

The number of partition points established for the initial set of partition points 122 may be selected at random or as part of a function. For example, the number of partition points in the initial set of partition points may be selected at random at twenty. Alternatively, the initial set of partition points 122 may designed to establish an initial partition point for each year of age of the customer.

Referring generally to FIG. 12, an embodiment of a set of partitions established using the genetic algorithm and the techniques described above is presented, and represented generally by reference numeral 130. In this embodiment, the number of partition points has been reduced to one, $B_1$, represented generally by reference numeral 132. The value of $B_1$ is twenty-seven. In this embodiment, this means that a first dummy variable, $B_1$, will represent the customer ages from the first endpoint 124 to the first partition point 132, or the customer's ages from eighteen to twenty-seven. A second dummy variable, $B_2$, is used to represent the customer ages from the first partition point 132 to the second endpoint 126, or the customer's ages from twenty-eight to sixty. These dummy variables are then used to develop a propensity model.

Referring generally to FIG. 13, an embodiment of a propensity model established using the dummy variables developed from the coarse-classing technique described above is presented, and represented generally by reference numeral 134. In this embodiment, the first input variable, $X_1$, corresponding to the customer's age, has been replaced by two dummy variables that correspond to two classes of the input variable, $B_1$ and $B_2$. As discussed above, $B_1$ and $B_2$ correspond to ranges of the customer's ages. The propensity model is adapted to identify a customer's propensity to respond in a given manner based on the customer's characteristics.

As noted above, propensity models are a sub-set of all predictive models. The techniques described above have been tailored to propensity models, i.e., predictive models where the output variable is either "0" or "1". However, they may be adapted for use in developing other predictive models where the output variable may be any real value. For example, a predictive model may use a regression technique to predict a future profit based on past experiences with customers. Thus, the output of the predictive model may be any real number, i.e., from $-\infty$ to $+\infty$. An example of an equation of a predictive model is shown below:

$$f(X) = \beta_0 + \beta_1 X_1 + \beta_2 X_2 + \ldots + \beta_n X_n, y \in R \quad (6)$$

where: R is the set of real numbers.

In general, the techniques describe above for coarse-classing a propensity model may be applied to all predictive models. Thus, by utilizing the techniques for coarse-classing described above, equation (6) may be transformed into the following equation:

$$f(X) = \beta_0 + \beta_1 B_1 + \beta_2 B_2 + \beta_3 B_3 + \beta_4 X_2 + \ldots + \beta_n X_n, y \in R \quad (7)$$

As with the propensity model, an objective function may be used in the process of coarse-classing an input variable, "X", into sub-ranges, $B_1$, $B_2$, etc. As noted above, the fundamental purpose of an objective function utilized in coarse-classing is to find sub-ranges of an input variable, such that each sub-range is quite different from its neighboring sub-ranges. However, the predictive power established by equation (3) and the adjacency value established by equation (4) are not applicable when the range of the output variable is the set of real numbers, as opposed to "0's" and "1's". An adjacency equation may be used that is adapted to distinguish sub-ranges of an input variable from their neighbor sub-ranges when the range is the set of real numbers, as shown below:

$$A_i = \frac{1}{2}\left(\frac{\sigma_i + \sigma_{i-1}}{|\mu_i - \mu_{i-1}|} + \frac{\sigma_i + \sigma_{i+1}}{|\mu_i - \mu_{i+1}|}\right) \quad (8)$$

For a given sub-range, "i", of an input variable, the adjacency equation uses the mean value, "$\mu_i$", of the output variable for the data points for the given sub-range, "i", and the mean values, "$\mu_{i-1}$" and "$\mu_{i+1}$", of an adjacent sub-ranges, "i−1" and "i+1." In addition, the adjacency equation (8) uses the standard deviation, "$\sigma_i$", of the output variable for the data points for the given sub-range, "i", and the standard deviations, "$\sigma_{i-1}$" and "$\sigma_{i+1}$", of an adjacent sub-ranges, "i−1" and "i+1." The value $A_i$ is lower if the output variables for the data points in a particular sub-range of inputs were close to each other and also distant from those in adjacent sub-ranges. The objective function is given as the average of the adjacency values of all of the sub-ranges of input data points. As above, a genetic algorithm may be used to coarse-class the range of the input data points to minimize the adjacency value. These coarse-classes are then used to develop a predictive model.

Referring generally to FIG. 14, an embodiment of a computer-based system for implementing and using the processes and techniques described above is presented, and represented generally by reference numeral 150. The computer-based system 150 includes one or more processors 152, a memory 154, and computer readable media 156. The processor 150 is configured to implement the processes and techniques described above. The memory 152 is coupled to the one or more processors 150. The memory 152 may store programs, data, and/or algorithms to implement the above processes and techniques. In addition, the programs, data, and/or algorithms to implement the above processes and techniques may be stored on one or more tangible, non-transitory computer readable media and provided to the memory 152 and/or the one or more processors 150. Examples of computer readable media include, but are not limited to, compact discs, optical discs (e.g., DVD discs), non-volatile memory devices, and USB devices.

The technical effect of the technique is to develop a propensity model to describe the propensity of a customer, or customers, to respond to an event in a particular manner. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of developing a propensity model for an event using one or more computer implemented routines, wherein the routines when executed by a processor perform actions comprising:
    establishing a set of functions to represent a range of data inputs, each data input having a corresponding output, wherein each function represents a sub-range of the range of data inputs;
    processing the set of functions to establish new sub-ranges of the range of data inputs; and
    establishing a model for an event based on the new sub-ranges of data inputs and their corresponding outputs.

2. The method of claim 1, wherein establishing a set of functions to represent a range of data comprises establishing a plurality of sets of functions, each set of functions representing the range of data inputs.

3. The method of claim 1, wherein processing the set of functions to establish new sub-ranges of the range of data inputs comprises processing the plurality of sets of functions with a genetic algorithm.

4. The method of claim 3, wherein processing the plurality of sets of functions with a genetic algorithm comprises swapping a value of a variable of a function in a first set of functions with a value of a variable of a function in the second set of functions.

5. The method of claim 3, wherein processing the plurality of sets of functions with a genetic algorithm comprises replacing a value of a variable in the function with a random value.

6. The method of claim 1, wherein processing the set of functions comprises processing the set of functions in a continuous manner until a stopping criterion is reached.

7. The method of claim 6, wherein processing the set of functions in a continuous manner comprises maintaining at least one function from generation to generation as a standard based on an objective factor.

8. The method of claim 1, wherein establishing a propensity model for an event based on the new sub-ranges of data inputs comprises identifying a set of functions from among a plurality of sets of functions based on diversity of outputs of adjacent sub-ranges of data that the sets of functions represent.

9. The method of claim 8, wherein each new sub-range of data inputs is an input to a different portion of the propensity model.

10. A computer-implemented system for developing a propensity model, comprising:
   a memory device having a plurality of routines stored therein;
   a processor configured to execute the plurality of routines stored in the memory device, the plurality of routines comprising:
   a routine configured to effect, when executed, establishing a set of functions to represent a range of data inputs, each data input having a corresponding output, wherein each function represents a sub-range of the range of data inputs;
   a routine configured to effect, when executed, processing the set of functions to establish new sub-ranges of the range of data inputs; and
   a routine configured to effect, when executed, establishing a propensity model for an event based on the new sub-ranges of data inputs and their corresponding outputs.

11. The system as recited in claim 10, wherein the system is adapted to process the set of functions is adapted to process the set of functions based on a genetic algorithm.

12. The system as recited in claim 11, wherein the genetic algorithm is adapted to direct the system to randomly change a value in a function of the set of functions.

13. The system as recited in claim 11, wherein the genetic algorithm is adapted to direct the system to randomly swap a value in a first set of functions with a corresponding value in a second set of functions.

14. The system as recited in claim 10, wherein the system adapted to process the set of functions is adapted to process the set of functions to maximize diversity of outputs between adjacent sub-ranges of the range of data inputs.

15. One or more tangible, non-transitory, computer-readable media encoded with executable instructions for developing a propensity model, the executable instructions comprising:
   instructions adapted to establish a set of functions to represent a range of data inputs, each data input having a corresponding output, wherein each function represents a sub-range of the range of data inputs;
   instructions adapted to process the set of functions to establish new sub-ranges of the range of data inputs; and
   instructions adapted to establish a propensity model for an event based on the new sub-ranges of data inputs and their corresponding outputs.

16. A method of processing data to develop a propensity model for an event using one or more computer-implemented routines, wherein the routines when executed by the processor perform actions, comprising:
   establishing a set of functions to represent a range of data inputs, each data input having a corresponding output, wherein each function represents a sub-range of the range of data inputs; and
   processing the set of functions to establish new sub-ranges of the range of data inputs based on maximizing diversity between the corresponding outputs of adjacent sub-ranges of the range of data inputs.

17. The method of claim 16, comprising:
   establishing a propensity model for an event based on the new sub-ranges of data inputs.

18. The method of claim 16, wherein processing the set of functions comprises processing the set of functions with a genetic algorithm.

19. The method of claim 18, wherein the set of functions comprises a plurality of sets of functions and processing the set of functions with a genetic algorithm comprises combining a first set of functions with a second set of functions to create a third set of functions.

20. The method of claim 19, wherein the set of functions comprises a plurality of sets of functions and processing the set of functions with a genetic algorithm comprises swapping a value of a variable of a function in a first set of functions with a value of a variable of a function in the second set of functions to create a third set of functions.

21. The method of claim 19, wherein the set of functions comprises a plurality of sets of functions and processing the set of functions with a genetic algorithm comprises performing a mathematical operation of a value of a variable of a function in a first set of functions with a value of a variable of a function in the second set of functions to create a new value of the variable in a third set of functions.

22. The method of claim 18, wherein processing the plurality of sets of functions with a genetic algorithm comprises replacing a value of a variable in the function with a random value.

* * * * *